US011114089B2

(12) United States Patent
Chapman et al.

(10) Patent No.: US 11,114,089 B2
(45) Date of Patent: Sep. 7, 2021

(54) CUSTOMIZING A VOICE-BASED INTERFACE USING SURROUNDING FACTORS

(71) Applicant: International Business Machines Corporation, Armonk, NY (US)

(72) Inventors: Matthew Chapman, Eastleigh (GB); Chengxuan Xing, Romsey (GB); Andrew J. Daniel, Hampshire (GB); Ashley Harrison, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/194,613

(22) Filed: Nov. 19, 2018

(65) Prior Publication Data

US 2020/0160844 A1 May 21, 2020

(51) Int. Cl.
*G10L 15/20* (2006.01)
*G10L 15/07* (2013.01)
*G06F 21/62* (2013.01)
*G10L 15/22* (2006.01)

(52) U.S. Cl.
CPC .......... *G10L 15/07* (2013.01); *G06F 21/6245* (2013.01); *G10L 15/22* (2013.01); *G10L 15/20* (2013.01); *G10L 2015/228* (2013.01)

(58) Field of Classification Search
CPC .... G10L 15/07; G10L 15/22–2015/228; G06F 21/6245
USPC ........................................................ 704/233
See application file for complete search history.

(56) References Cited

U.S. PATENT DOCUMENTS

| | | | |
|---|---|---|---|
| 5,970,446 A * | 10/1999 | Goldberg ................ | G10L 15/20 704/233 |
| 6,651,043 B2 * | 11/2003 | Ammicht ................ | G10L 15/22 704/231 |
| 7,212,969 B1 | 5/2007 | Bennett | |
| 8,032,282 B2 * | 10/2011 | Yamanaka ........... | B60G 17/018 701/37 |
| 9,680,983 B1 | 6/2017 | Schuster et al. | |
| 10,757,207 B1 * | 8/2020 | Kharwandikar ...... | G06F 16/955 |

(Continued)

FOREIGN PATENT DOCUMENTS

WO 2017111501 A1 6/2017

OTHER PUBLICATIONS

McNaull et al., "Flexible context aware interface for ambient assisted living," Human-centric Computing and Information Sciences 2014, Jan. 8, 2014, 41 pages, http://www.hcis-journal.com/content/4/1/1.

(Continued)

*Primary Examiner* — Abul K Azad
(74) *Attorney, Agent, or Firm* — Peter Edwards

(57) ABSTRACT

A method, system, and computer program product for applying a profile to an assistive device based on a multitude of cues includes: gathering audio inputs surrounding an assistive device; analyzing, by the assistive device, the audio inputs; determining, based on the analyzing, scenario cues; classifying a current environment surrounding the assistive device from the scenario cues; comparing the current environment to device profiles of the assistive device; determining, based on the comparing, a matching profile; and, in response to determining the matching profile, executing the matching profile on the assistive device.

20 Claims, 8 Drawing Sheets

(56) References Cited

U.S. PATENT DOCUMENTS

| | | | |
|---|---|---|---|
| 10,803,859 B1* | 10/2020 | Williams | G10L 17/22 |
| 2015/0074644 A1* | 3/2015 | Oberheide | G06F 9/44505 |
| | | | 717/122 |
| 2016/0125891 A1 | 5/2016 | Nyshadham et al. | |
| 2017/0068513 A1* | 3/2017 | Stasior | G10L 15/32 |
| 2018/0330733 A1* | 11/2018 | Orr | G06F 16/435 |
| 2018/0366108 A1* | 12/2018 | Mukherjee | G06F 16/90335 |

OTHER PUBLICATIONS

Mell et al., "The NIST Definition of Cloud Computing", Recommendations of the National Institute of Standards and Technology, Sep. 2011, U.S. Department of Commerce, 7 pages.

* cited by examiner

CUSTOMIZING A VOICE-BASED INTERFACE USING SURROUNDING FACTORS

BACKGROUND

The present disclosure relates to assistive devices, and more specifically to applying a profile to an assistive device based on recognizing and analyzing a multitude of cues.

SUMMARY

The present invention provides a computer-implemented method, system, and computer program product for recognizing and analyzing a multitude of cues and applying a profile to an assistive device based on the cues. The method may include gathering audio inputs surrounding an assistive device. The method may also include analyzing, by the assistive device, the audio inputs. The method may also include determining, based on the analyzing, scenario cues. The method may also include classifying a current environment surrounding the assistive device from the scenario cues. The method may also include comparing the current environment to device profiles of the assistive device. The method may also include determining, based on the comparing, a matching profile. The method may also include, in response to determining the matching profile, executing the matching profile on the assistive device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
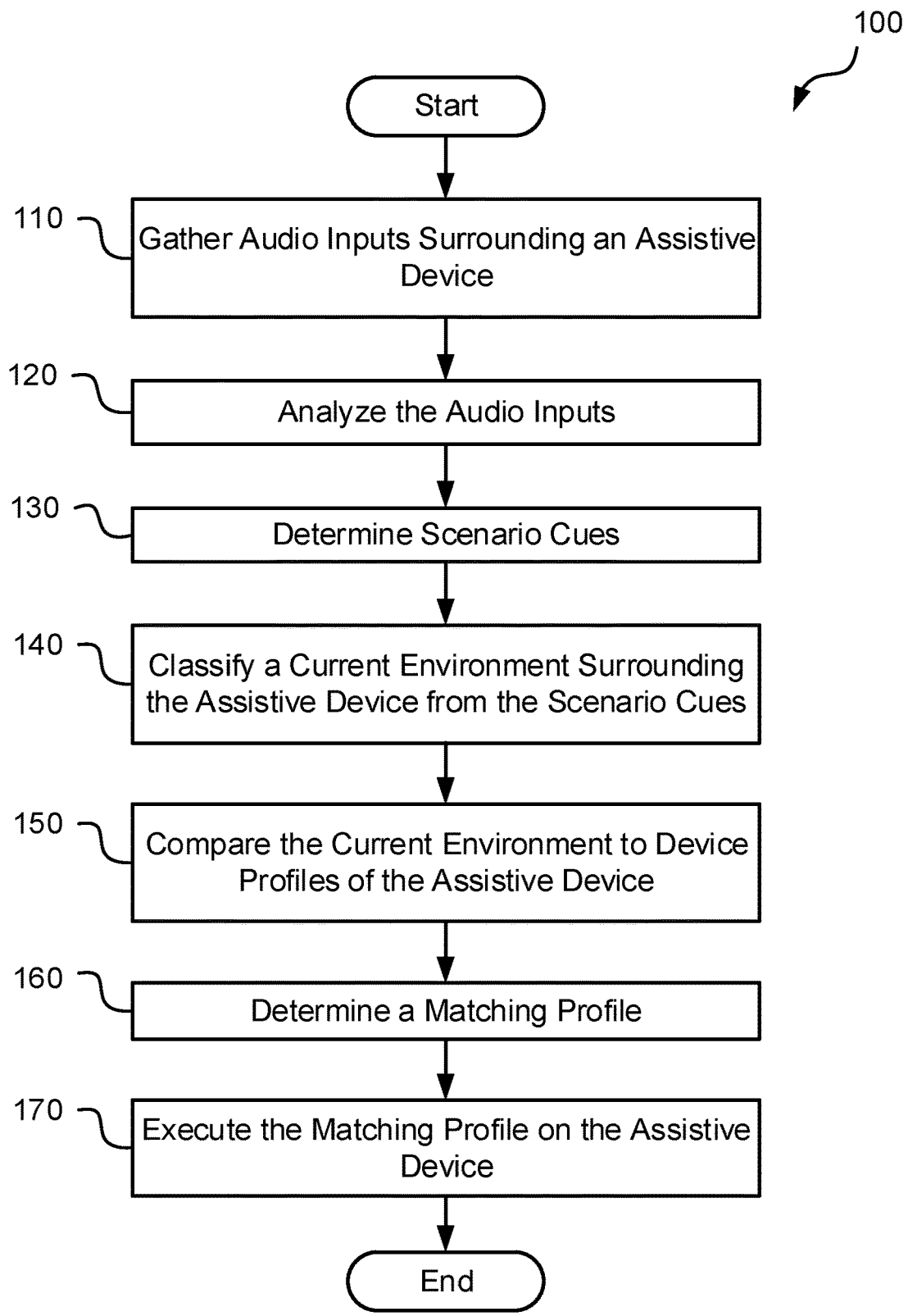
FIG. 1 depicts a flowchart of a set of operations for applying a profile to an assistive device based on a multitude of cues, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to assistive devices, and more specifically to applying a profile to an assistive device based on recognizing and analyzing a multitude of cues. While the present disclosure is not necessarily limited to such applications, various aspects of the disclosure may be appreciated through a discussion of various examples using this context.

Voice user interfaces (e.g., virtual assistants) have manual options for controlling the interface (e.g., volume controls, settings, etc.) but may not change or adjust unless the manual options are enacted. Various problems, particularly in relation to the setting or surroundings of the user and the voice user interface, may arise because the voice user interface does not change or adjust its settings. For example, the voice user interface may say personal information about the user in situations where the user does not want his personal information exposed. In another example, the volume of the voice user interface may be too loud for the surroundings of the user, which may disrupt the user and others in the surrounding area. Voice user interfaces may be user interfaces that interact with a user through sound or speech. These voice user interfaces may be embedded in or connected to a computer system. A device or computer system containing, or connected to, a voice user interface may be referred to herein as an assistive device. The system as a whole, with at least the assistive device and the voice user interface may be referred to herein as a voice-based system.

The present disclosure provides a computer-implemented method, system, and computer program product for recognizing and analyzing a multitude of cues and applying a profile to an assistive device based on the cues. A voice-based system, with an assistive device and a voice user interface, may combine a variety of audio inputs plus other factors to classify a current environment, and then applies predefined changes to its own behavior and/or the behavior of connected devices. In addition, the voice-based system may adapt the originally pre-defined profiles based on user behavior over time. The voice-based system offers a more personal experience for the user so that fewer manual commands need to be issued by the user. Further, by applying predefined changes to the device such that fewer commands by the user are needed, the required processing necessary for the assistive device to achieve the settings preferred by the user in the specific environment is significantly reduced. The processing necessary for the assistive device may be reduced because the assistive device, and the voice-based system, may immediately, or at least efficiently, achieve the desired settings due to the predefined changes (or profile). Without the profile, a user may be frequently changing the settings of the device (e.g., turning the volume up and down, locking certain features, etc.) until the desired settings are achieved.

Referring now to FIG. 1, a flowchart illustrating a method 100 for applying a profile to an assistive device based on a multitude of cues is depicted, according to some embodiments. In some embodiments, the method 100 is implemented as a computer script or computer program (e.g., computer executable code) to be executed by a server on or connected to a computer system (e.g., assistive device 410

Figure 6:
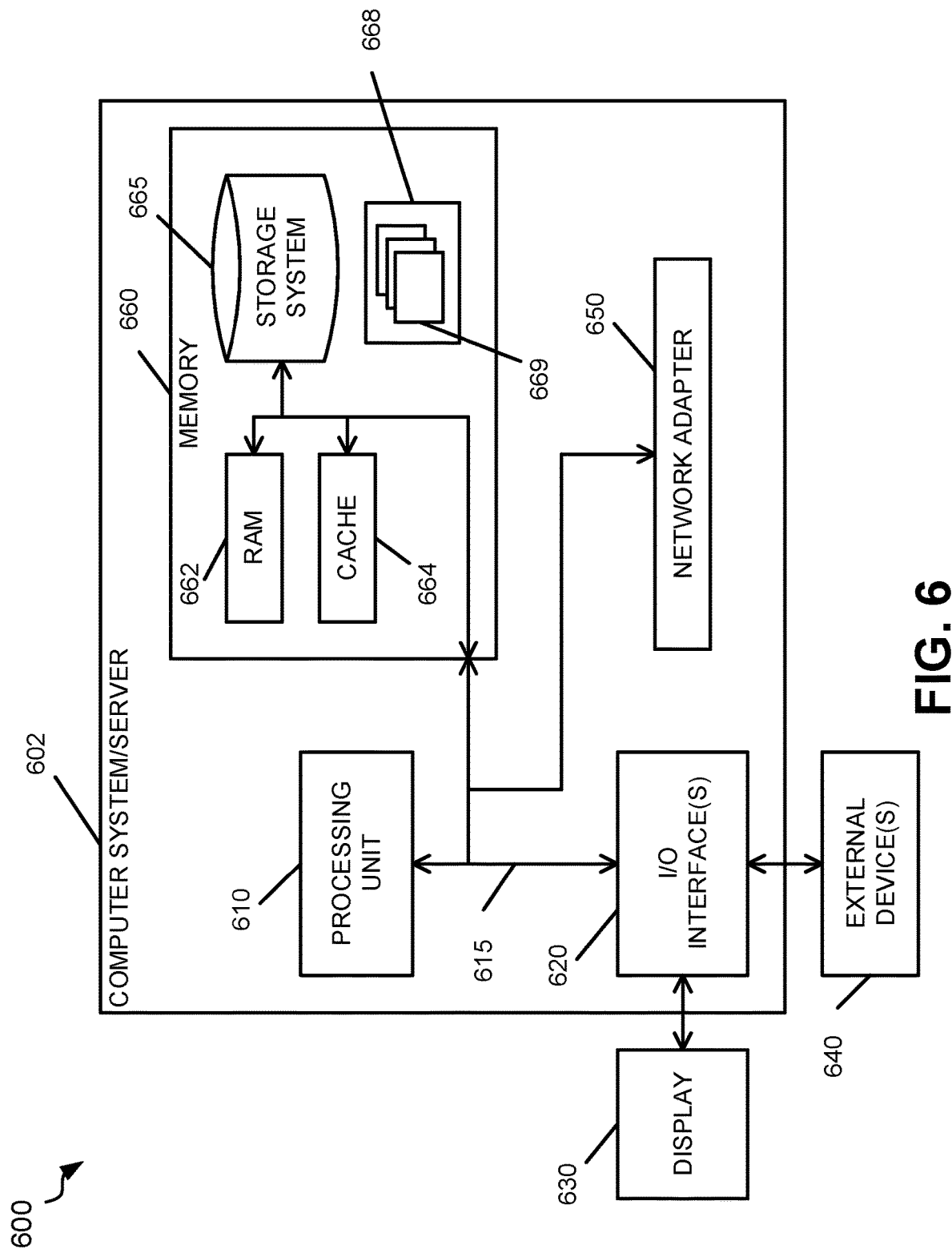
FIG. 6 depicts a block diagram of a sample computer system, according to some embodiments.

(FIG. 4) or computer system 600 (FIG. 6)). In some embodiments, the server is a computer device, such as computer system/server 602 (FIG. 6).

In some embodiments, a server is configured to execute operation 110 to gather audio inputs surrounding an assistive device. As discussed herein, an assistive device is a device that either includes, or is connected to, a voice user interface. In some embodiments, the assistive device, or some component that is connected to the assistive device, may be continuously gathering audio inputs in an area, or range, surrounding the assistive device. In some embodiments, audio inputs surrounding an assistive device include all sounds that are within a range, or area, of the assistive device such that they can actually be heard, or detected, by the assistive device, or a component of the voice-based system connected to the assistive device. In some embodiments, audio inputs surrounding an assistive device include all sounds that are within a particular area (e.g., a room) of the assistive device. In some embodiments, gathering audio inputs is a continuous process and the device, or a microphone attached to the device, is configured to continuously listen for audio inputs.

In some embodiments, a server is configured to execute operation 120 to analyze the audio inputs. In some embodiments, the assistive device and/or the voice user interface may require a continuous input of sounds in order to search for and identify triggers. In other words, some component of the voice-based system that is connected to the assistive device may continuously be listening to its surrounding environment for triggers. For example, the voice user interface can have a specific code word or phrase that it continuously analyzes the input for in order to know when to start interacting with a user. In some embodiments, the assistive device analyzes the audio input for any recognizable and unrecognizable sounds. Analyzing the audio input may include using various technologies such as natural language processing, speech-to-text or text-to-speech processing, etc. In some embodiments, the audio inputs are analyzed on a cloud server connected to the assistive device and/or the voice user interface. In some embodiments, the cloud server is communicatively connected to the assistive device and/or the voice user interface through a cloud computing environment 50 from FIG. 7 and FIG. 8.

In some embodiments, a server is configured to execute operation 130 to determine scenario cues. Determining scenario cues may include using the analysis of the audio inputs to search for and identify recognizable cues. Recognizable cues may be sounds or other data that help identify an environment surrounding the assistive device. For example, scenario cues can include known or unknown voices present, animal sounds, utensil sounds, appliance noises, time of day, and location of the assistive device.

In some embodiments, the user registers specific sounds. For example, a user may like to listen to music when cooking, so the user may register their kitchen appliance sounds and/or utensil sounds as scenario cues to help indicate when the user is cooking. In another example, the user may register various locations around their house with the device so that the device is aware of what room in the house it is in. In some embodiments, the assistive device learns recognizable sounds over time. Using the previous example where a user may like to listen to music while cooking, the device may learn that when it hears specific noises (e.g., utensil noises and/or appliance noises) the user requests music. The device may then classify these sounds as recognizable sounds, and these sounds may become scenario cues. In another example, because the inputs may be continuously gathered, the device may learn/recognize which voices are frequently heard on the device.

In some embodiments, voices categorized as "known voices" are voices that the device has frequently heard through the audio inputs (e.g., a voice that device has recognized in audio inputs at least a threshold amount over a particular amount of time). In some embodiments, there may be a duration threshold (e.g., a time threshold such as time per day, time per week, etc.) that is used to determine whether a voice is known. In some embodiments, a voice that is detected in the audio input for an amount of time that is greater than a duration threshold may be a known voice. For example, the same voice may be detected from the audio input 5 hours per day. In this example, the duration threshold may be 4 hours per day, therefore the detected voice is categorized as a known voice. Voices that do not meet or exceed the duration threshold may be unknown voices. In some embodiments, a user of the assistive device trains the voice user interface with their own voice, and possibly voices of other family members that the user wants recognized as known voices. Known and unknown voices are further discussed herein and depicted in FIG. 3.

In some embodiments, the device connects to other smart devices and obtains additional scenario cues. For example, the assistive device may connect to a smart TV and determines whether the TV is on or off. In another example, the assistive device may connect to a smart phone and becomes aware of whether the smart phone is being used or not. Additionally, smart devices, such as a smart phone, may have additional data (e.g., weather, calendar, specific location, etc.) that can be used as scenario cues.

In some embodiments, a server is configured to execute operation 140 to classify a current environment surrounding the assistive device from the scenario cues. Classifying a current environment may include compiling the scenario cues. In some embodiments, the compiled scenario cues are the current environment. In some embodiments, the scenario cues that are compiled are scenario cues from an audio input gathered at the current time. In some embodiments, classifying a current environment may include identifying the relevant scenario cues and arranging or sorting the determined scenario cues based on their relevancy. In some embodiments, the user identifies various scenario cues, or categories of scenario cues, as relevant or important. For example, the user may not want their personal information shared, so the user may set "unknown voices" as a relevant scenario cue. Then, the "unknown voices" scenario cue may be listed towards the top of the scenario cues or may be weighted when determining a matching profile (discussed further herein).

In some embodiments, a server is configured to execute operation 150 to compare the current environment to device profiles of the assistive device. In some embodiments, a user of the assistive device creates various device profiles with scenario cues for each profile. Each device profile may have specific settings designated to be applied, or executed, when the device profile is activated. For example, a user may create a "party profile" with scenario cues such as an evening time of day (e.g., after 7 PM), a location in the living room, a presence of unknown voices, etc. In this example, the user may have also set up the profile so that when the "party profile" is active, the music volume is increased, and personal or sensitive information of the user is locked so that it is not revealed to unknown individuals.

In some embodiments, the assistive device has at least one initial default profile, but additional device profiles are learned and created by the server. The server may start identifying patterns or correlations between the scenario cues and adjusted settings by a user. For example, a user may want to listen to music while cooking dinner, so the user frequently turns on music and increases the volume while cooking. In this example, the server may identify that when there are scenario cues such as appliance sounds and utensil sounds, and/or when the assistive device is in the kitchen, the user turns on and increases the volume of the music. The server may create a device profile for a change in settings (i.e., the music turning on and the volume increasing) with the specific scenario cues. In some embodiments device profiles may both be learned/created by the server and created by the user.

In some embodiments, comparing the current environment to the device profiles includes comparing the scenario cues of the current environment to the scenario cues of each device profile. In some embodiments, the scenario cues are assigned different priority or weight to help indicate their importance. The user may set up or indicate weights for the various scenario cues, in some embodiments. For example, a user may want to ensure that her personal information is not shared, so the user sets up, or inputs, a large weight for the unknown voice scenario cue, so that if there is an unknown voice present, it will be highly considered when comparing profiles.

In some embodiments, a server is configured to execute operation 160 to determine a matching profile from the device profiles. In some embodiments, determining the matching profile includes selecting a device profile from the device profiles that is most similar to the current environment. In some embodiments, a device profile that is most similar is a device profile from the device profiles with the highest amount of scenario cues that are the same as the scenario cues of the current environment.

In some embodiments, the matching profile is the device profile from the device profiles that has the most, or highest amount of, priority or weighted scenario cues that are the same as the priority, or weighted, scenario cues of the current environment. In circumstances where there are multiple device profiles with the same, or very similar, amount of priority scenario cues that are the same as (or match) the current environment, the matching profile may be the profile that has the highest amount of priority scenario cues that are the same as the priority scenario cues of the current environment and the highest amount of scenario cues, as a whole, that are the same as the scenario cues of the current environment.

In some embodiments, there is always a device profile being executed on the assistive device. The matching profile, in some instances, may be a profile that was already being executed on the device (i.e., a current profile) prior to the execution of method 100. In other instances, the matching profile may be a different device profile than the current profile.

In some embodiments, a server is configured to execute operation 170 to execute the matching profile on the assistive device. Executing the matching profile may include applying the settings of the matching profile on the assistive device. For example, the matching profile may include settings such as withholding personal information, turning on music, and increasing the volume of the music. In this example, when the matching profile is executed, the assistive device settings are adjusted so that personal information is withheld, the music is turned on, and the volume of the music is increased (e.g., to a volume of 20 on the device). In some embodiments, when the matching profile is the current profile, executing the matching profile includes keeping the same settings of the assistive device.

In some embodiments, after the matching profile is executed, the user requests to change a factor, or setting, of the matching profile. For example, the user may want to further increase the volume of the music from the music volume of the matching profile. In some embodiments, this user requested setting change (i.e., changed factor) better fits, or matches a different device profile. In this case, a different device profile, that better matches the setting change, is executed on the assistive device. In some embodiments, the server creates a new device profile using the current environment and the changed factor. The new device profile may become one of the device profiles that can be selected as a matching profile.

Figure 2:
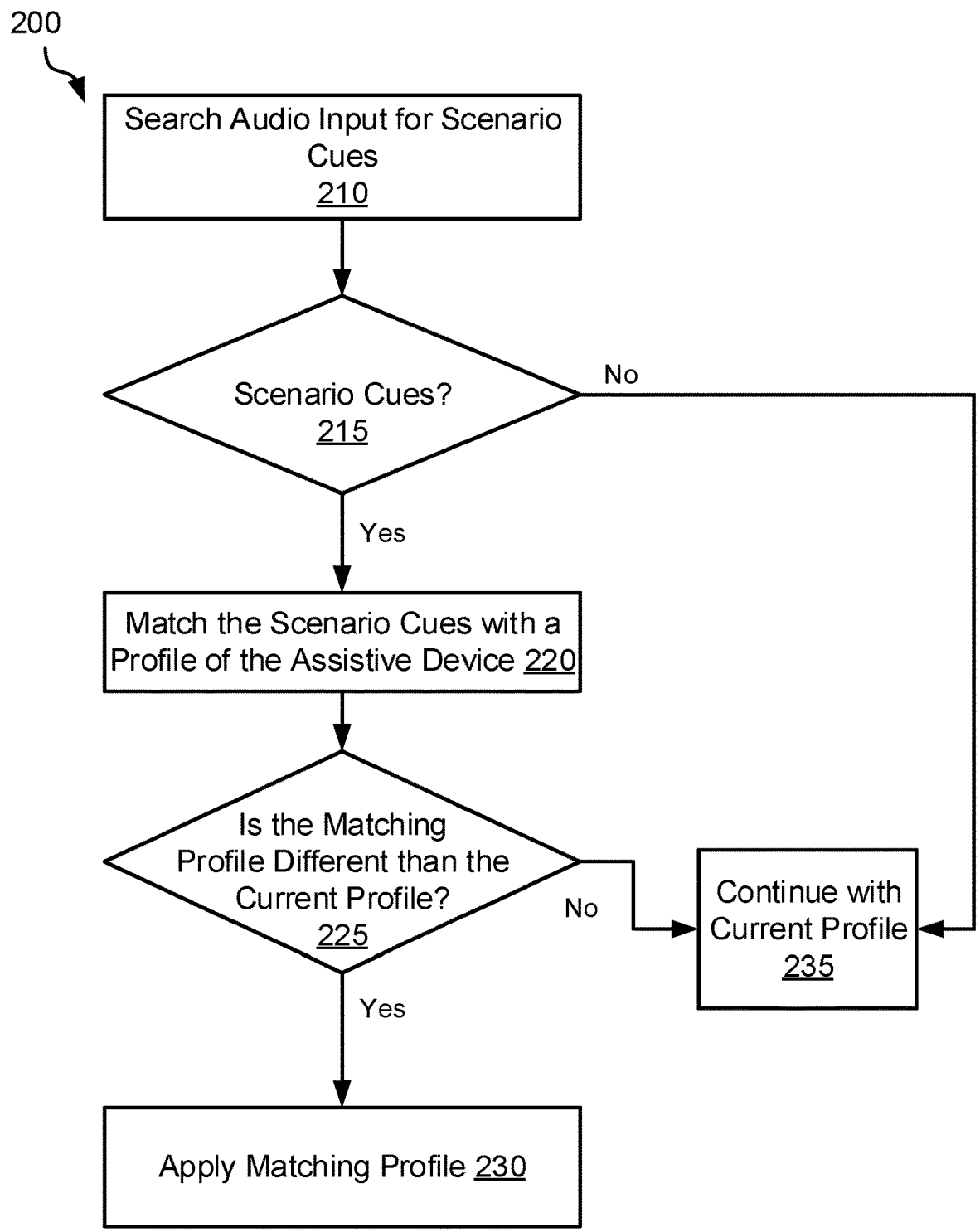
FIG. 2 depicts a flowchart of a set of operations for determining which profile to apply to an assistive device, according to some embodiments.

Referring to FIG. 2, a flowchart illustrating a method 200 for determining which profile to apply to an assistive device is depicted, according to some embodiments. In some embodiments, the method 200 is implemented as a computer script or computer program (e.g., computer executable code) to be executed by a server on or connected to a computer system (e.g., assistive device 410 (FIG. 4) or computer system 600 (FIG. 6). In some embodiments, the server is a computer device, such as computer system/server 602 (FIG. 6).

In operation 210, a server may search the audio input for scenario cues. In some embodiments, operation 210 is part of operation 120 of analyzing the audio inputs of FIG. 1. Searching the audio input for scenario cues may include identifying any scenario cues within the audio input. In operation 215, the server determines whether there are any scenario cues within the audio input, from the searching. If there are no scenario cues, the server continues with the current device profile being executed on the assistive device, in operation 235. If there are scenario cues within the audio input, the server continues to operation 220 to match the scenario cues with a profile of the assistive device. Matching the scenario cues with a profile of the assistive device may include determining a profile that best matches the scenario cues. Operation 220 may correspond with operation 160 of FIG. 1.

In operation 225, it is determined whether the matching profile, or the device profile that best matches the scenario cues, is different than the current profile being executed on the assistive device. If the matching profile is the same as, or is not different than, the current profile, the server may continue to operation 235 and continue with the current profile of the assistive device. In this embodiment, the current profile continues being executed and is not replaced with a different device profile. If the matching profile is different than the current profile, the server may continue to operation 230 and applies the new matching profile. In some embodiments, operation 230 corresponds to operation 170 of FIG. 1.

Figure 3:
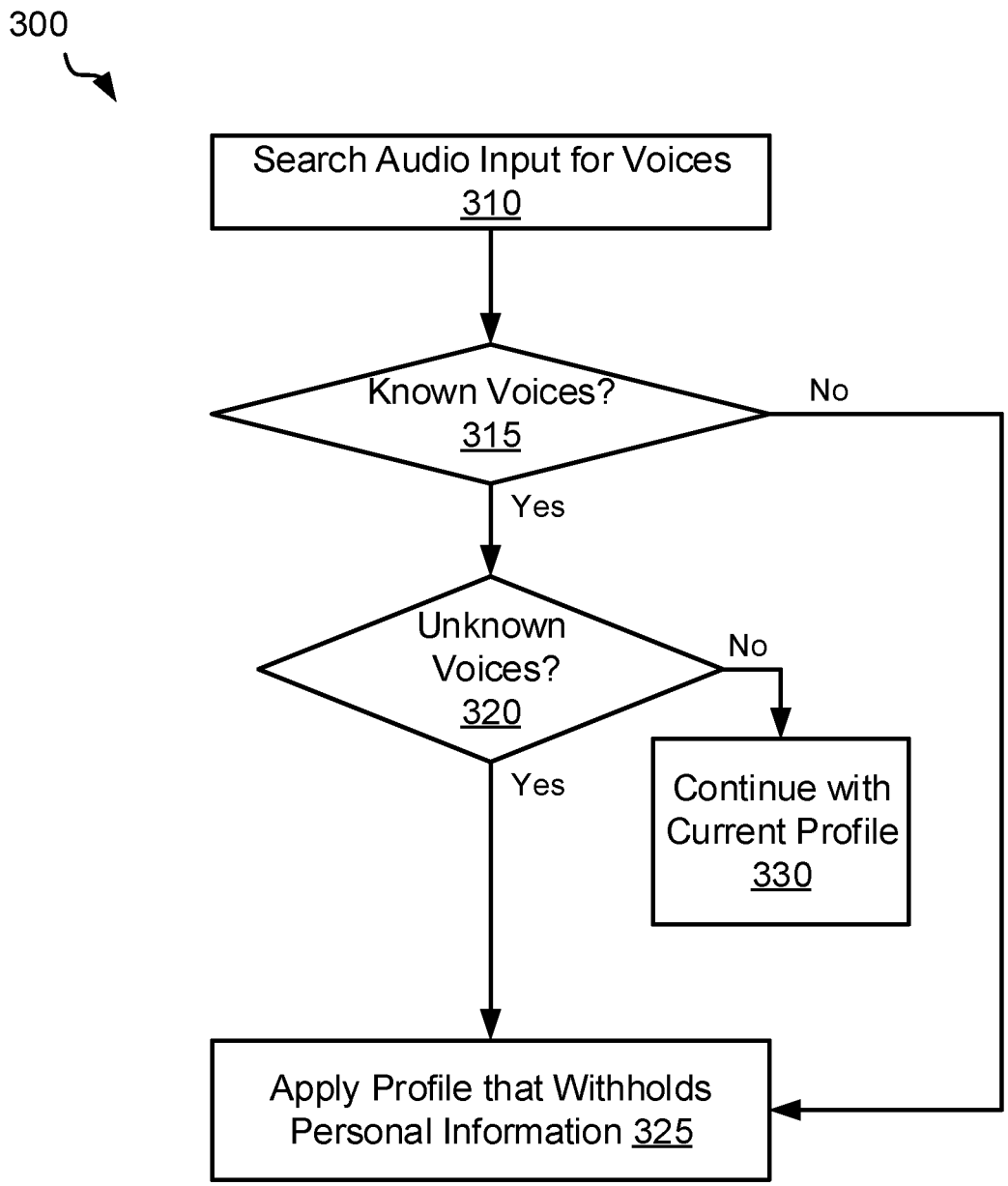
FIG. 3 depicts a flowchart of a set of operations for determining which profile to apply in the presence of known or unknown voices, according to some embodiments.

Referring to FIG. 3, a flowchart illustrating a method 300 for determining which profile to apply in the presence of known or unknown voices is depicted, according to some embodiments. In some embodiments, the method 300 is implemented as a computer script or computer program (e.g., computer executable code) to be executed by a server on or connected to a computer system (e.g., assistive device 410 (FIG. 4) or computer system 600 (FIG. 6). In some embodiments, the server is a computer device, such as computer system/server 602 (FIG. 6).

Method 300 may begin with operation 310 to search an audio input for voices. In some embodiments, operation 310 may correspond to operation 210 of FIG. 2 and/or may be part of operation 120 of analyzing the audio inputs of FIG. 1. In some embodiments, the voices are a specific scenario cue that the server is searching for. The voices may be a priority scenario cue in some instances.

The method 300 may continue to operation 315 to determine whether the audio input includes any known voices. As discussed herein, known voices may be voices that the device has frequently heard through the audio inputs. If there are no known voices within the audio input, the server may continue to operation 325 and apply a device profile that withholds personal information. The server may ensure that the matching profile that is executed/applied, for instance in operation 170 of FIG. 1, is a profile that includes a setting that withholds personal or sensitive information from being shared. For example, the server may receive a request asking about a doctor's appointment the next day. In this example, when a profile is applied that withholds personal information, only the time of the appointment is shared, but not the location or the doctor. In another example, the server receives a request asking for a user's account number. When a profile is applied that withholds personal information, the server does not share the user's account number.

In some embodiments, if it is determined that the audio input does include known voices, the server continues to operation 320 to determine whether there are unknown voices within the audio input. In other words, operation 320 may determine whether there are any unknown voices in a surrounding area of the assistive device. If there are no unknown voices, the server may proceed to operation 330 and continue with the current profile. In some embodiments, when there are no unknown voices near an assistive device, the assistive device may not withhold personal information. In some embodiments, if it is determined that the audio input does include unknown voices, the server may proceed to operation 325 and apply a device profile that withholds personal information.

Figure 4:
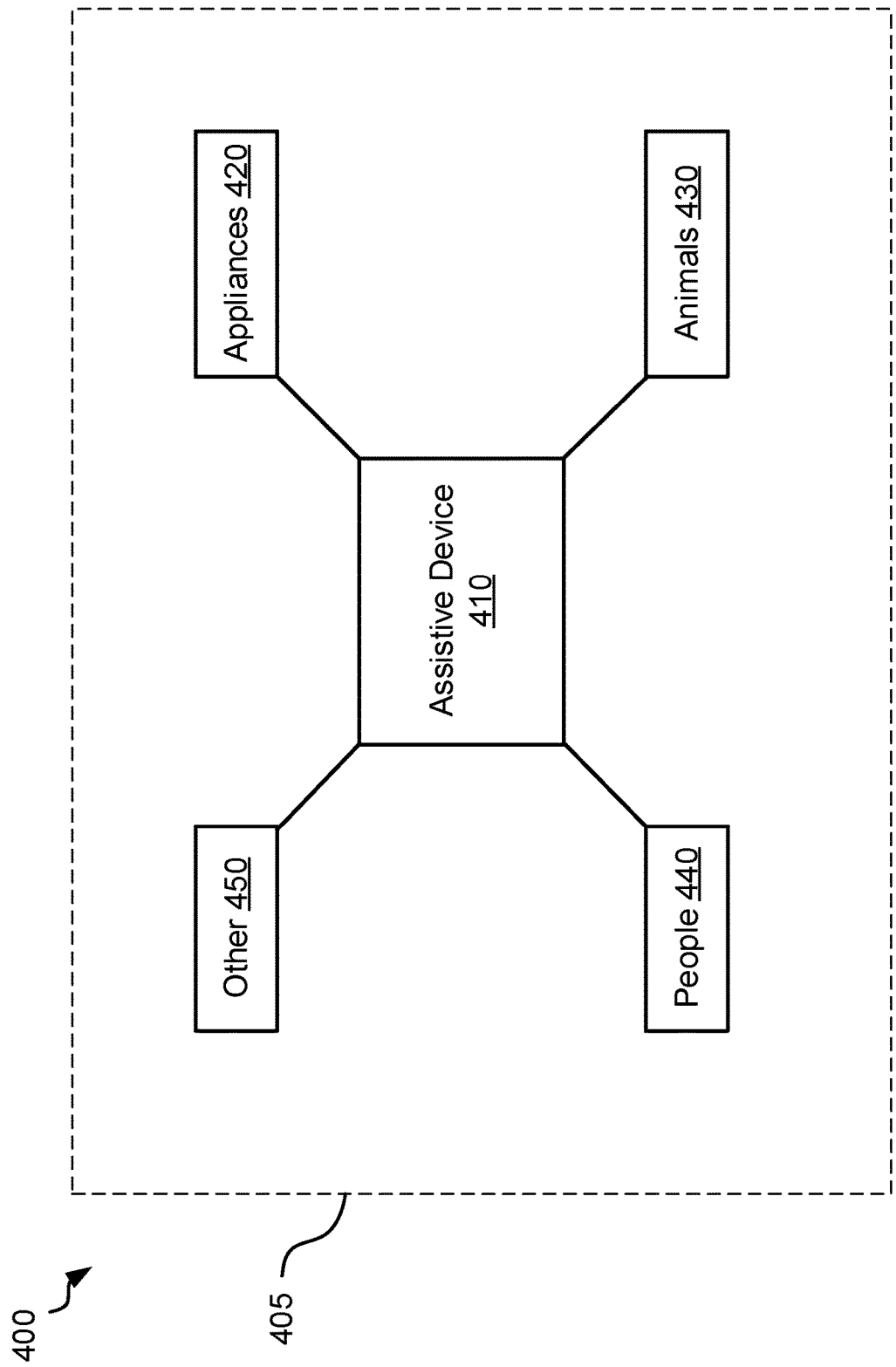
FIG. 4 depicts a block diagram of an example assistive device and surrounding cues, according to some embodiments.

Referring to FIG. 4, a block diagram of an example environment 400 with an assistive device and surrounding cues is depicted, according to some embodiments. In example environment 400, an assistive device 410 has a surrounding area 405. In some embodiments, surrounding area 405 is a sensor range (e.g., a range of sound that the assistive device, or a microphone attached to the assistive device, can pick up). In some embodiments, surrounding area 405 is a particular area (e.g., a room) in which the assistive device 410 is located. In example environment 400, the assistive device 410 is surrounded by appliances 420, animals 430, people 440, and other 450 (e.g., devices or things that help identify scenario cues). In some embodiments, appliances 420, animals 430, people 440, and other 450 have audio sounds that include scenario cues. For example, appliances 420 include a microwave, and a microwave beep may be a scenario cue. In another example, a dog bark (i.e., a noise from animal 430) is a scenario cue. Audio inputs from people 440 may include the presence of known or unknown voices (discussed further herein and depicted in FIG. 3) and may also include a volume of voices (e.g., whether the voices are loud or soft, the approximate number of voices are detected). Example environment 400 is just one example of a surrounding environment of an assistive device. Other surrounding environments consistent with the embodiments of this disclosure are also contemplated.

Figure 5:
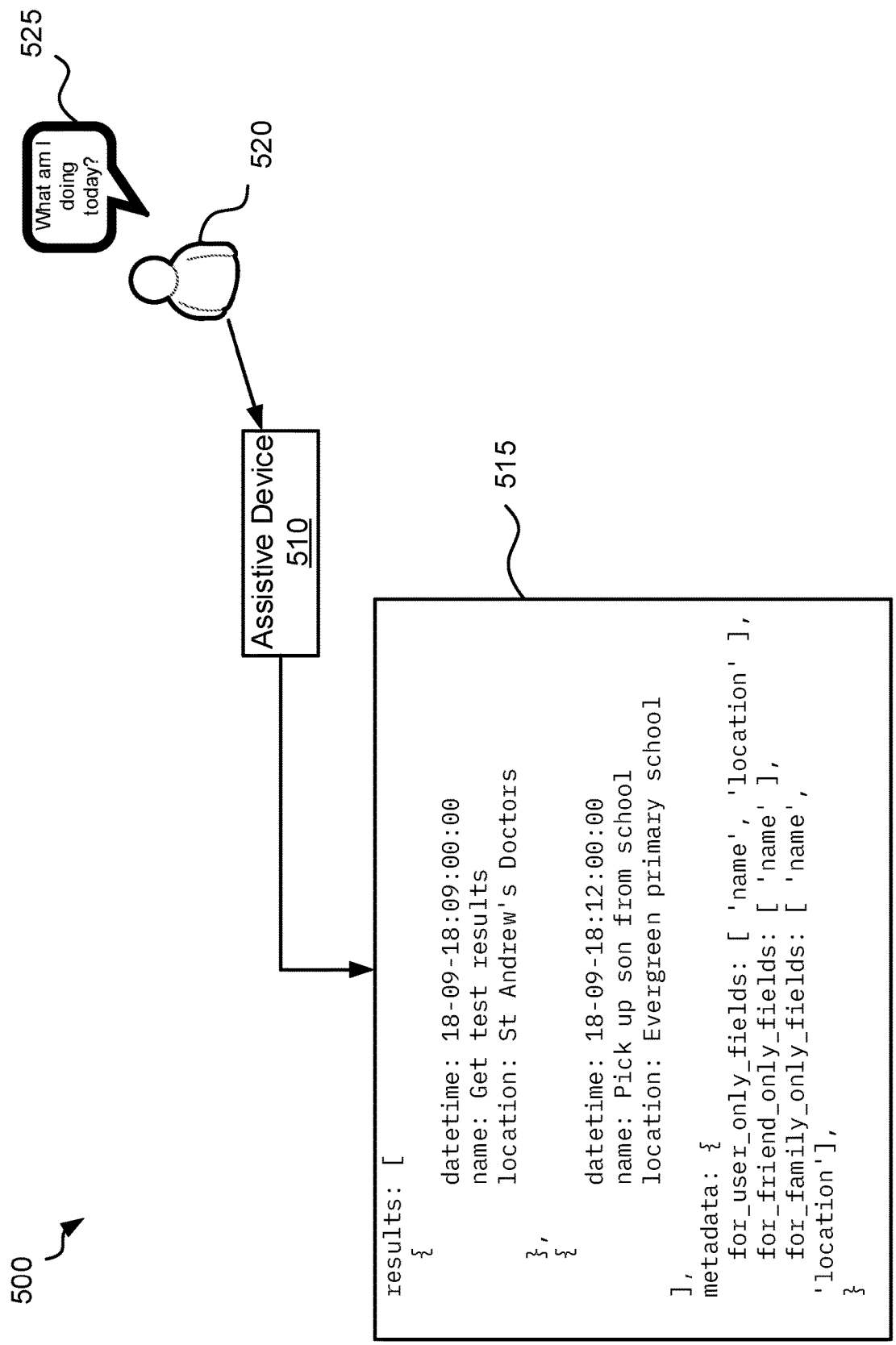
FIG. 5 depicts a schematic diagram of an assistive device when asked a specific question, according to some embodiments.

Referring to FIG. 5, a schematic diagram 500 of an example situation is depicted, according to some embodiments. In FIG. 5, a user 520 asks an assistive device 510 "what am I doing today" 525. Once the assistive device 510 registers the question 525 from the user 520, a server of the assistive device may execute an algorithm 515 for profile selection. Algorithm 515 may search a calendar of the user 520 and identify that the user 520 has two events "Get test results" and "Pick up son from school." The algorithm 515 may gather the date, time, name, location, etc. of the event. In some embodiments, the assistive device 510 includes, or is connected to, a calendar of the user 520. In some embodiments, the calendar is a part of the program or operating system of the assistive device 510. In some embodiments, assistive device 510, or a server of the assistive device 510, is connected to a smart device (e.g., smart phone) of the user 520 and the smart device includes a calendar.

In algorithm 515, the server has three different options of outputs in response to question 525, depending on the presence of known or unknown voices. If the user is the only voice (as determined from the scenario cues surrounding the assistive device 510) within a vicinity of assistive device 510, the server may share at least the name and location of the events. As illustrated in FIG. 5, if there are voices of people who meet the "friend only" condition in the surrounding area of the user 520 (e.g., unknown voices or voices of friends), the server may only share the name of the events, as the date, time, and location may be personal information (e.g., because a profile was applied that withholds personal information such as in operation 325 of FIG. 3). As illustrated in FIG. 5, if there are additional voices in the surrounding area of the user 520, but those additional voices are voices of people who meet the "family only" condition (e.g., family members who also live at the same residence as the user 520), the server may share at least the name and location of the events. FIG. 5 is just one example of a process and algorithm for selecting a profile. Other processes and algorithms for selecting a profile that are otherwise consistent with the embodiments of this disclosure are contemplated.

Referring to FIG. 6, computer system 600 is a computer system/server 602 is shown in the form of a general-purpose computing device, according to some embodiments. The components of computer system/server 602 may include, but are not limited to, one or more processors or processing units 610, a system memory 660, and a bus 615 that couple various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random-access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the invention.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
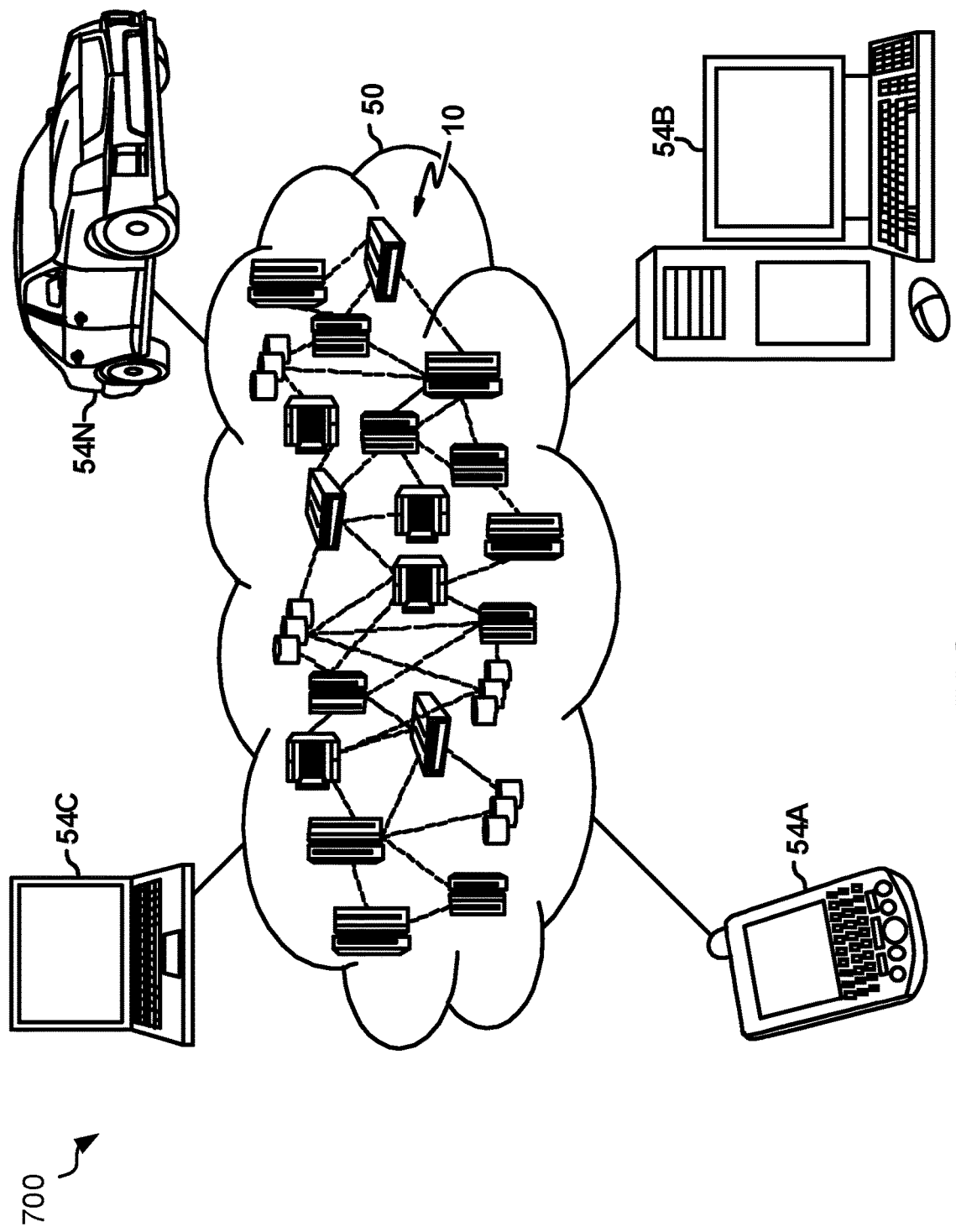
FIG. 7 depicts a cloud computing environment, according to some embodiments.

Referring now to FIG. 7, illustrative cloud computing environment 700 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
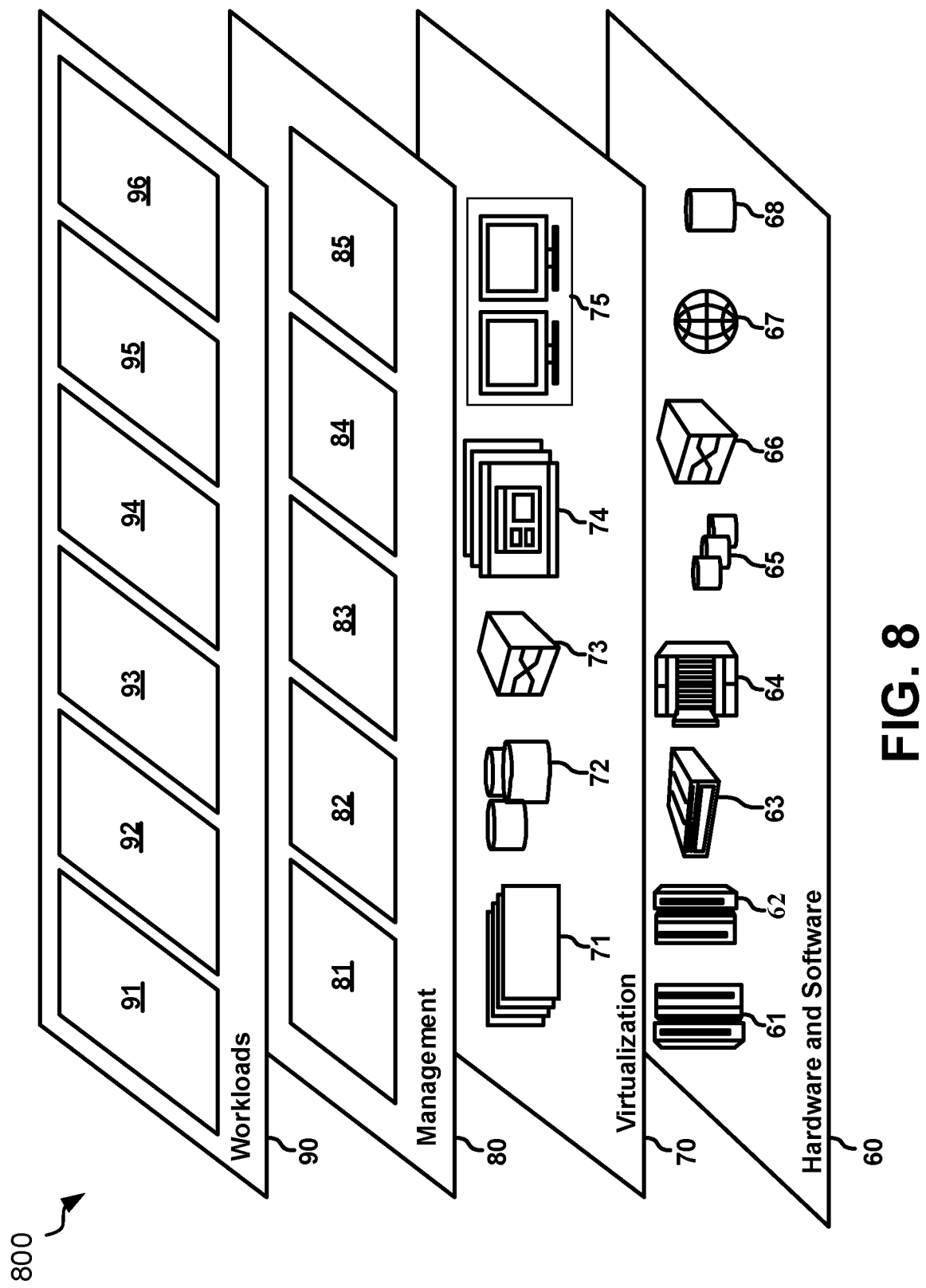
FIG. 8 depicts abstraction model layers, according to some embodiments.

Referring now to FIG. 8, a set of functional abstraction layers 800 provided by cloud computing environment 50 (FIG. 7) is shown, according to some embodiments. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech recognition and processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   gathering audio inputs surrounding an assistive device;
   analyzing, by the assistive device, the audio inputs;
   determining, based on the analyzing, scenario cues, wherein determining the scenario cues comprises:
      determining whether the audio inputs include known voices and unknown voices;
   assigning weights to each scenario cue to indicate their importance;
   classifying a current environment surrounding the assistive device from the scenario cues and the assigned weights;
   comparing the current environment to device profiles of the assistive device;
   determining, based on the comparing, a matching profile, the matching profile including privacy settings, wherein the matching profile is determined based on whether the audio inputs include the known voices or the unknown voices and based on the assigned weights of each scenario cue; and
   in response to determining the matching profile, executing the matching profile on the assistive device.

2. The method of claim 1, wherein determining the matching profile includes selecting a device profile from the device profiles that is most similar to the current environment.

3. The method of claim 2, wherein the matching profile is a current profile.

4. The method of claim 2, wherein the matching profile is a device profile different from a current profile.

5. The method of claim 1, wherein scenario cues include at least known or unknown voices.

6. The method of claim 5, wherein classifying the current environment includes determining that there are scenario cues of unknown voices.

7. The method of claim 6, wherein the matching profile is a profile that withholds personal information.

8. The method of claim 1, wherein the device profiles are set up by a user of the assistive device.

9. The method of claim 1, further comprising:
   in response to executing the matching profile, receiving a request from a user to change a factor of the matching profile; and
   executing a different device profile that includes the changed factor.

10. The method of claim 1, further comprising:
    in response to executing the matching profile, receiving a request from a user to change a factor of the matching profile; and
    creating a new device profile using the matching profile and the changed factor.

11. The method of claim 1, wherein scenario cues include at least one of utensil sounds and appliance noises.

12. A system having one or more computer processors, the system configured to:
gather audio inputs surrounding an assistive device;
analyze, by the assistive device, the audio inputs;
determine, based on the analyzing, scenario cues, wherein determining the scenario cues comprises:
determining whether the audio inputs include known voices and unknown voices;
assign weights to each scenario cue to indicate their importance;
classify a current environment surrounding the assistive device from the scenario cues and the assigned weights;
compare the current environment to device profiles of the assistive device;
determine, based on the comparing, a matching profile, the matching profile including privacy settings, wherein the matching profile is determined based on whether the audio inputs include the known voices or the unknown voices and based on the assigned weights of each scenario cue; and
in response to determining the matching profile, execute the matching profile on the assistive device.

13. The system of claim 12, wherein determining the matching profile includes selecting a device profile from the device profiles that is most similar to the current environment.

14. The system of claim 13, wherein the matching profile is a current profile.

15. The system of claim 13, wherein the matching profile is a device profile different from a current profile.

16. The system of claim 12, further comprising:
in response to executing the matching profile, receive a request from a user to change a factor of the matching profile; and
execute a different device profile that includes the changed factor.

17. The system of claim 12, further comprising:
in response to executing the matching profile, receive a request from a user to change a factor of the matching profile; and
create a new device profile using the matching profile and the changed factor.

18. A computer program product comprising a non-transitory computer readable storage medium having program instructions embodied therewith, the program instructions executable by a server to cause the server to perform a method, the method comprising:
gathering audio inputs surrounding an assistive device;
analyzing, by the assistive device, the audio inputs;
determining, based on the analyzing, scenario cues, wherein determining the scenario cues comprises:
determining whether the audio inputs include known voices and unknown voices;
assigning weights to each scenario cue to indicate their importance;
classifying a current environment surrounding the assistive device from the scenario cues and the assigned weights;
comparing the current environment to device profiles of the assistive device;
determining, based on the comparing, a matching profile, the matching profile including privacy settings, wherein the matching profile is determined based on whether the audio inputs include the known voices or the unknown voices and based on the assigned weights of each scenario cue; and
in response to determining the matching profile, executing the matching profile on the assistive device.

19. The computer program product of claim 18, wherein determining the matching profile includes selecting a device profile from the device profiles that is most similar to the current environment.

20. The computer program product of claim 18, further comprising:
in response to executing the matching profile, receiving a request from a user to change a factor of the matching profile; and
executing a different device profile that includes the changed factor.

* * * * *